(12) United States Patent
Ridealgh et al.

(10) Patent No.: US 10,526,243 B2
(45) Date of Patent: Jan. 7, 2020

(54) BIRD SAFE GLAZING

(71) Applicant: PILKINGTON GROUP LIMITED, Lathom (GB)

(72) Inventors: John Andrew Ridealgh, Cuddington (GB); Vikash Ranjan, Perrysburg, OH (US); Liam Sonie Palmer, Southport (GB); David Alan Strickler, Toledo, OH (US); Simon John Slade, Ormskirk (GB)

(73) Assignee: Pilkington Group Limited, Lathom (GB)

( * ) Notice: Subject to any disclaimer, the term of this patent is extended or adjusted under 35 U.S.C. 154(b) by 0 days.

(21) Appl. No.: 15/580,795

(22) PCT Filed: Jun. 10, 2016

(86) PCT No.: PCT/GB2016/051747
§ 371 (c)(1),
(2) Date: Dec. 8, 2017

(87) PCT Pub. No.: WO2016/198901
PCT Pub. Date: Dec. 15, 2016

(65) Prior Publication Data
US 2018/0222793 A1 Aug. 9, 2018

Related U.S. Application Data

(60) Provisional application No. 62/173,994, filed on Jun. 11, 2015.

(51) Int. Cl.
*C03C 17/34* (2006.01)
*A01M 29/08* (2011.01)
(Continued)

(52) U.S. Cl.
CPC ........ *C03C 17/3417* (2013.01); *A01M 29/08* (2013.01); *B32B 3/263* (2013.01);
(Continued)

(58) Field of Classification Search
CPC . E06B 3/66; E06B 3/6612; E06B 3/67; E06B 3/6715; Y02B 80/22; Y02B 80/24;
(Continued)

(56) References Cited

U.S. PATENT DOCUMENTS 4,988,424 A * 1/1991 Woodward ............ C23C 14/044
118/504
8,598,470 B2 * 12/2013 Kagawa ................... B32B 3/30
174/386

(Continued)

FOREIGN PATENT DOCUMENTS

AT 508210 A1 11/2010
JP 2002059737 A 2/2002
(Continued)

OTHER PUBLICATIONS

European Patent Office, The International Search Report with Written Opinion issued in PCT/GB2016/051747, dated Sep. 6, 2016; 10 pages, European Patent Office, Rijswijk, Netherlands.
(Continued)

*Primary Examiner* — Donald J Loney
(74) *Attorney, Agent, or Firm* — Marshall & Melhorn, LLC

(57) ABSTRACT

Bird collisions with windows or other glazings are minimized or prevented with a glazing comprising as least one substrate with a UV reflectance coating deposited over the substrate in a patterned arrangement comprised of a plurality of stripes, and each of the plurality of stripes has a thickness that changes by 10 nm or less over every 1 mm in width. Such an arrangement of stripes having soft edges are less
(Continued)

apparent, and thus more aesthetically pleasing, when compared with a similar arrangement of stripes formed with hard edges, while providing an effective deterrent to bird collisions. The glazing may also be utilized as part of a laminated glazing or insulated glazing unit. A method of manufacturing the glazing is also provided.

20 Claims, 11 Drawing Sheets

(51) Int. Cl.
| | |
|---|---|
| E06B 3/66 | (2006.01) |
| B32B 3/26 | (2006.01) |
| C03C 17/25 | (2006.01) |
| C03C 17/245 | (2006.01) |
| C03C 17/36 | (2006.01) |
| E06B 3/67 | (2006.01) |

(52) U.S. Cl.
CPC ........ *C03C 17/2453* (2013.01); *C03C 17/253* (2013.01); *C03C 17/3482* (2013.01); *C03C 17/3636* (2013.01); *C03C 17/3681* (2013.01); *C03C 2217/734* (2013.01); *E06B 3/66* (2013.01); *E06B 3/6715* (2013.01); *Y02B 80/22* (2013.01)

(58) Field of Classification Search
CPC .............. B32B 3/263; B32B 17/10192; B32B 17/10211; C03C 17/4317; C03C 17/3482; C03C 17/3636; C03C 17/3681; C03C 17/2453; C03C 17/253; A01M 29/08
See application file for complete search history.

(56) References Cited

U.S. PATENT DOCUMENTS

| | | | |
|---|---|---|---|
| 9,650,290 B2 | 5/2017 | Vikor et al. | |
| 2009/0047487 A1* | 2/2009 | Klem, Jr. ............... | A01M 29/06 428/210 |
| 2012/0207952 A1* | 8/2012 | Walp ....................... | C03C 17/04 428/34 |
| 2014/0370208 A1* | 12/2014 | Walp ....................... | C03C 17/04 428/34 |
| 2014/0370209 A1* | 12/2014 | Walp .................... | E06B 3/6604 428/34 |
| 2016/0137850 A1 | 5/2016 | Ridealgh et al. | |

FOREIGN PATENT DOCUMENTS

| | | |
|---|---|---|
| JP | 2013148687 A | 8/2013 |
| JP | 2014180251 A | 9/2014 |
| WO | 2014/188196 A1 | 11/2014 |
| WO | 2015/183681 A1 | 5/2015 |

OTHER PUBLICATIONS

English translation of the two paragraphs on p. 11, under Section 2.3.3, "Window Test," of Ornilux Mikado, Vogelanprall an Glasflaechen Prufbericht, Prufung im Flugtunnel II der Biologischen Station Hohenau-Ringelsdorf, Martin Rossler im Auftrag der Wiener Umweltanwaltschaft, Wien; Feb. 2012, p. 11.

* cited by examiner

BIRD SAFE GLAZING

BACKGROUND OF THE INVENTION

The present invention relates to a glazing for minimizing or preventing bird collisions with windows or other glazings. The invention further relates to a method of manufacturing such a glazing.

Bird deaths due to window strikes represent one of the greatest threats to avian mortality next to habitat destruction. Due to the reflective and transparent characteristics of glass, the glass is not perceived as a barrier to the bird. The bird does not recognize that reflections of, for example, the sky, other buildings, vegetation and even open space, are false. As a result, the bird flies into the glass. Typically, the glass is a glazing in a building, for example, a window, but could equally be a glass balcony, a glazed door, etc.

Many millions of birds die each year from collisions with glass on buildings. While songbirds are most at risk from collisions with glass, nearly 300 species have been reported as collision victims, including hummingbirds, woodpeckers, kingfishers, waders and birds of prey. It is likely that these numbers will grow as advances in glass technology and production make it possible to construct buildings with all-glass curtain walls, in addition to the general increase in the amount of glass being used in architecture.

The reduction of bird strikes can be achieved in a number of ways. A common approach involves creating a visual signal that alerts the birds to the presence of the glass. Known techniques include the use of fritting, i.e. the placement of ceramic lines or dots on glass, the use of screens, latticework, or grilles. More recently however, it has been shown that the use of ultraviolet (UV) patterns on glass may help birds to detect the presence of the glass.

Many families of birds are tetrachromatic, possessing four types of cone cells each with a distinctive maximal absorption peak. In some bird families, the maximal absorption peak of the cone cell responsible for the shortest wavelength extends to the UV range, making them UV-sensitive. As such, many birds are able to see into the UV spectrum, in particular in the range 300 to 400 nm, a range largely invisible to humans.

A UV reflective coated glass for preventing bird collisions is known under the registered trade mark Ornilux Mikado®. The glass has a UV patterned coating which is visible to birds but substantially invisible to the human eye. However, it is a disadvantage of such a glazing in that it relies only on a UV-reflective coating, and it is believed that in order to be an effective bird deterrent, UV patterns need to have a strong contrast.

Thus, in WO 2014/188196 A1 a bird safe glazing was described in which a glass substrate was provided with an antireflection coating, such as that found on the Pilkington Optiview™ coated glass product, and a striped $TiO_2$ coating was produced thereover by $TiO_2$ deposition through a mask in contact with the glass substrate. The reflective $TiO_2$ not only provided enhanced UV reflectance, but also destroyed the antireflective effect of the antireflection coating at the stripe location. This provided a dual enhancement of the UV pattern. Consequently, birds readily saw the sharp-edged contrasting stripe pattern and the risk of bird collision with the glazing was minimized.

However, a disadvantage of using $TiO_2$ stripes to preferentially reflect UV light is that they also reflect and absorb visible radiation, though to a lesser extent. FIG. 1 shows a glazing 1 according to an embodiment of WO 2014/188196 A1. The glazing includes comprises a substrate 4 having a first surface 8 and a second surface 10. An antireflection coating 12 is provided directly on to the first surface 8, and a UV reflectance coating 14 is provided on top of the antireflection coating 12 in a patterned arrangement comprising a plurality of stripes 14. The stripes 14 are formed by a coating process utilizing a mask in contact with the substrate, resulting in stripes 14 that are substantially rectangular in profile with sharp edges 15. This means that although the stripes are substantially transparent, they can be perceived by humans.

SUMMARY OF THE INVENTION

It is an object of the present invention to provide an improved glazing for minimizing or preventing bird collisions with windows, while reducing the impact on human visual perception of a pattern on the glazing.

According to an aspect of the invention, there is provided a glazing for minimizing or preventing bird collisions with windows or other glazings, the glazing comprising as least one substrate with a UV reflectance coating deposited over the substrate in a patterned arrangement comprised of a plurality of stripes, wherein each of the plurality of stripes has a thickness that changes by 10 nm or less over every 1 mm in width, preferably by 6 nm or less over every 1 mm, more preferably by 3 nm or less over every 1 mm, and even more preferably, each of the plurality of stripes has a thickness that changes by 1.5 nm or less over every 1 mm in width. At a point n, the thickness change per mm width=(thickness at point n minus thickness at point n−1)/(position at point n minus position at point n−1). In this manner, each stripe is provided with "soft" rather than "hard" or sharp edges that render the patterned arrangement less perceptible to humans when viewed up close, while retaining the effectiveness of the glazing in minimizing or preventing bird collisions. The invention solves a problem, not recognised in the prior art, that bird collisions with glazings for many bird species are linked to reflections of the environment, such as vegetation or sky, in the glazing and therefore a glazing for minimising bird collisions should be optimised according to bird behaviour in relation to such reflections. The inventors have selected a test method of effectiveness which includes a reflection of vegetation.

According to another aspect of the invention, there is a method of manufacturing a glazing for minimizing or preventing bird collisions with windows or other glazings, the method comprising providing at least one substrate having a surface, providing a mask that is spaced apart from the surface of the substrate, the mask comprising a patterned arrangement of apertures, the patterned arrangement comprising a plurality of stripes, and directing a coating material through the apertures in the mask to the surface of the substrate to deposit a UV reflectance coating in a patterned arrangement on the surface of the substrate, the patterned arrangement comprising a plurality of stripes.

According to the method according to the invention, the mask may be spaced from the substrate and positioned relative to the source of the coating material such that the UV reflectance coating defines a plurality of stripes that are not linked or touching one another; i.e. the stripes are not interconnected. However, the mask may also be spaced from the substrate and positioned relative to the source of the coating material such that the thickness of the UV reflectance coating does not drop to zero between the stripes; i.e. the stripes are interconnected. As long as there is a difference between the maximum coating thickness at each stripe and the minimum coating thickness between the stripes of at least 10 nm, both arrangements are considered to define a "plurality of stripes" as used herein.

Preferably, the antireflection coating is provided adjacent the UV reflectance coating. Preferably, the antireflection coating is provided adjacent the substrate.

Preferably, the stripes are arranged parallel to a longitudinal axis of the substrate. Preferably, the stripes are equidistantly spaced apart from one another.

Preferably, the patterned arrangement is a regular pattern. Preferably, the patterned arrangement has at least one line of symmetry. Preferably, the line of symmetry is perpendicular to the longitudinal axis of the glazing. Preferably, the patterned arrangement comprises a repeating pattern.

Preferably, the UV reflectance coating covers at least 20% of the subjacent surface. Most preferably, this coating covers at least 25% of the subjacent surface.

In a preferred arrangement, a plurality of wide UV-reflecting stripes of a width in the range of 1 cm and 10 cm are deposited on top of an antireflection coating, where the stripe width is defined as the full-width at half-maximum; that is, the stripe width is the width from the point on one side of the point of maximum thickness where the thickness has dropped to half of that maximum thickness to the point on the other side of the point of maximum thickness where the thickness has dropped to half of the maximum thickness. The stripes are spaced at a pitch in the range of 1 cm to 10 cm; that is, the spacing between the start of one stripe and the start of the adjacent stripe is in the range of 1 cm to 10 cm. Advantageously, the arrangement provides an enhanced contrast over the whole visible range but with an optimised contrast in the UV range. Thus, the antireflection coating in combination with the patterned UV reflectance coating enhances bird visible UV reflected light in one area of the pattern while minimizing broadband reflection (including bird-visible UV) in other areas to maximize the apparent contrast in bird vision. The effect of this is to produce a pattern that is highly visible to birds so allowing, for example, birds to avoid fatal collisions with buildings glazed with these coatings.

Preferably, the UV reflectance coating is deposited on an exterior facing surface of the substrate. This surface is often referred to as "surface #1" of the glazing.

The reflectance of glass can be reduced by the application of appropriate thin film interference coatings—"Anti-Reflection coatings". For a broad spectral response such coatings generally fall into 3 categories, as follows:
1) Single layer coatings of porous low index materials such as porous silica—which give an intermediate effective refractive index between glass and air, so reducing the reflectance at the interfaces;
2) Three layer medium/high/low refractive index combinations. An example of such a combination is Glass/46 nm $ZnSnO_x$/93 nm $TiO_2$/75 nm $SiO_2$; and
3) Four layer high/low/high/low refractive index combinations such as the "Pilkington Optiview" coated glass (nominally Glass/12 nm $SnO_x$/25 nm $SiO_2$/110 nm $SnO_x$/90 nm $SiO_2$).

All of these categories are considered to be equally valid for the purposes of the present invention, as are other variations based on the same principles.

Preferably, the antireflection coating comprises a plurality of layers. Preferably, said layers comprise a first layer comprising tin oxide ($SnO_2$). Preferably, the first layer, most preferably $SnO_2$, has a geometric thickness of between substantially 5 nm and 100 nm, preferably between 10 nm and 50 nm, preferably between 10 nm and 20 nm, most preferably substantially 12 nm.

Preferably, a second layer is provided preferably comprising silicon dioxide ($SiO_2$), preferably the $SiO_2$ has a geometric thickness of between substantially 5 nm and 100 nm, preferably between 10 nm and 50 nm, preferably between 15 nm and 30 nm, most preferably substantially 25 nm. Most preferably, the second layer is deposited over the first layer.

Preferably, a third layer is provided preferably comprising fluorine doped tin oxide ($F:SnO_2$) preferably the $F:SnO_2$ had a geometric thickness of between substantially 5 nm and 200 nm, preferably between 50 nm and 150 nm, preferably between 100 nm and 120 nm, most preferably substantially 110 nm. Most preferably, the third layer is deposited over the second layer.

Preferably, a fourth layer is provided preferably comprising $SiO_2$. Preferably, the $SiO_2$ has a geometric thickness of between substantially 5 nm and 200 nm, preferably between 50 nm and 150 nm, preferably between 80 nm and 100 nm, most preferably substantially 90 nm. Most preferably, the fourth layer is deposited over the third layer. Such antireflection coating comprising said layers first to fourth respectively, is referred to as an Optiview coating.

Preferably, the UV reflectance coating comprises titanium dioxide ($TiO_2$). Preferably, this coating has a geometric thickness of between substantially 10-100 nm, more preferably from about 10-50 nm thick, and most preferably substantially 35 nm thick. Reference herein to the thickness of the UV reflectance coating refers to the difference between the maximum coating thickness at a stripe and the minimum coating thickness between the stripe and an adjacent stripe.

Preferably, the UV reflectance coating may be a single layer of titanium oxide ($TiO_2$). The coating may be deposited by magnetron sputtering, APCVD, LPCVD, PECVD, sol-gel, evaporation, electroplating/oxidation, atomic layer deposition, pulsed laser deposition, other thin film deposition techniques, or various printing techniques. More preferably, the UV reflectance coating is deposited by APCVD or magnetron sputtering, and most preferably by magnetron sputtering.

In a most preferred arrangement, the glazing comprises a plurality of coating layers having the sequential arrangement: substrate, preferably glass; $SnO_2$ having a geometric thickness of 12 nm; $SiO_2$ having a geometric thickness of 25 nm deposited over the $SnO_2$; $SnO_2:F$ having a geometric thickness of 110 nm deposited over the $SiO_2$; $SiO_2$ having a geometric thickness of 90 nm deposited over the $SnO_2:F$; UV reflectance coating comprising $TiO_2$ having a geometric thickness of 35 nm.

Preferably, the at least one substrate is a ply of glass, preferably a float or rolled glass. Preferably, the or each substrate of glass is a pane of extra clear glass (glass having greater than 85% visible light transmission (measured with Illuminant A) at thicknesses preferably from 2 to 20 mm, most preferably substantially 4 mm geometric thickness. The substrate may be a low-iron float glass, for example, having an iron content of 0.015% w/w or lower. The or each substrate may be a ply of tinted glass having a visible light transmission of less than 85%.

The invention is not limited to the substrate being a glazing in a building. For example, the substrate may be a door, a balcony, a spandrel. The substrate may be manufactured from polymeric material.

Preferably, the substrate comprises a surface #1 and a surface #2. Surface #1 is that surface of the substrate which faces the exterior of a building when mounted in use.

Preferably, an antireflection coating is provided on surface #1 and/or surface #2 of the substrate. Most preferably, a UV reflectance coating is provided on top of at least a part of the antireflection coating preferably when the antireflection coating is provided on surface #1. The antireflection coating may be on surface #2 with the UV reflectance coating deposited directly on top of said antireflection coating. Most preferably, the antireflection coating is provided on surface #1, and the plurality of stripes of the UV reflectance coating are provided directly on top of the antireflection coating. Preferably, the UV reflectance coating is provided on an exterior facing surface of the glazing. The antireflection coating may be provided on surface #2 of the substrate and the UV reflectance coating may be provided on surface #1 of the substrate.

Preferably, the glazing comprises a further coating, preferably a solar control coating, preferably a low-E coating.

According to a further aspect of the present invention there is provided a glazing for minimizing or preventing bird collisions with windows or other glazings, the glazing comprising at least one substrate, an antireflection coating, and a UV reflectance coating, wherein the antireflection coating is provided on a different surface of the substrate to that on which the UV reflectance coating is provided.

In a further aspect, the invention provides an insulated glazing unit for minimizing or preventing bird collisions with windows or other glazings, including a first sheet of glazing material, a second sheet of glazing material held in a spaced apart relationship to the first sheet of glazing material, an antireflection coating, and at least one UV reflectance coating, wherein the UV reflectance coating is provided in a patterned arrangement comprising a plurality of stripes having a thickness that changes by 10 nm or less over every 1 mm in width, and the antireflection coating is between the UV reflectance coating and either the first and/or second sheet of glazing material.

Various insulated glazing unit configurations are suitable for use in accordance with the invention, such as those described in WO 2014/188196 A1, which is incorporated by reference herein in its entirety.

Preferably, the first sheet of glazing material has a first surface (surface #1) and an opposing second surface (surface #2), the second surface of the first sheet of glazing material facing the space. The second sheet of glazing material has a third surface (surface #3) and an opposing fourth surface (surface #4), the third surface of the second sheet of glazing material facing the space. In use, surface #1 faces the exterior of a building.

Preferably, the antireflection coating is provided on the first surface of the unit. Preferably, a second antireflection coating is provided on the unit, preferably on the second surface. Most preferably, the UV reflectance coating is provided on top of the antireflection coating on the first surface and/or the second surface. The second antireflection coating may be provided on a fourth surface of the unit.

In a further aspect the invention provides an insulated glazing unit for minimizing or preventing bird collisions with windows or other glazings, comprising a first sheet of glazing material, a second sheet of glazing material, an antireflection coating, and a UV reflectance coating, characterised in that the antireflection coating is provided on a surface of the first and/or second sheet different to that on which the UV reflectance coating is provided.

Preferably, a further antireflection coating is provided on surface #1 and/or surface #2 and/or surface #3 and/or surface #4. Preferably, a further UV reflectance coating is provided on surface #1 and/or surface #2 and/or surface #3 and/or surface #4.

In a further aspect the invention provides an insulated glazing unit for minimizing or preventing bird collisions with windows or other glazings, comprising a first sheet of glazing material, a second sheet of glazing material, a third sheet of glazing material, at least one antireflection coating, and at least one UV reflectance coating, characterised in that said antireflection coating is between the UV reflectance coating and either the first and/or second sheet, and/or the third sheet of glazing material.

Preferably, the first sheet of glazing material has a first surface (surface #1) and an opposing second surface (surface #2), the second sheet of glazing material has a third surface (surface #3) and an opposing fourth surface (surface #4), and the third sheet of glazing material has a fifth surface (surface #5) and an opposing sixth surface (surface #6). In use in a building glazing, surface #1 faces the exterior of a building and surface #6 faces the interior of a building.

Preferably, an antireflection coating is provided on surface #1. The or a further antireflection coating may be provided on surface #2 and/or surface #3 and/or surface #4 and/or surface #5 and/or surface #6. Most preferably, a UV reflectance coating is provided on surface #1, preferably being deposited directly over the antireflection coating. The or a further UV reflectance coating may be provided on surface #2 and/or surface #3 and/or surface #4 and/or surface #5 and/or surface #6.

Preferably, at least one solar control coating or low E coating is provided on surface #2 and/or surface #3 and/or surface #4 and/or surface #5 and/or surface #6.

According to the method of the invention, at least one substrate is provided having a surface, a mask comprising a patterned arrangement of apertures is spaced apart from the surface of the substrate, the patterned arrangement comprising a plurality of stripes, and a coating material is directed through the apertures in the mask to the surface of the substrate to deposit a UV reflectance coating in a patterned arrangement on the surface of the substrate, the patterned arrangement comprising a plurality of stripes.

Preferably, UV reflectance coating is deposited using a sputtering process, preferably by a magnetron sputtering process, and more preferably by the reactive magnetron sputtering of titania.

In embodiments where least one antireflection coating is deposited over the surface of the substrate before depositing the UV reflectance coating, such deposition is preferably carried out using a chemical vapor deposition process.

All of the features described herein may be combined with any one of the above aspects, in any combination.

BRIEF DESCRIPTION OF THE DRAWINGS

Certain specific embodiments of the invention will now be described, by way of example only, with reference to the accompanying drawings, wherein.

DETAILED DESCRIPTION OF THE INVENTION

Figure 1:
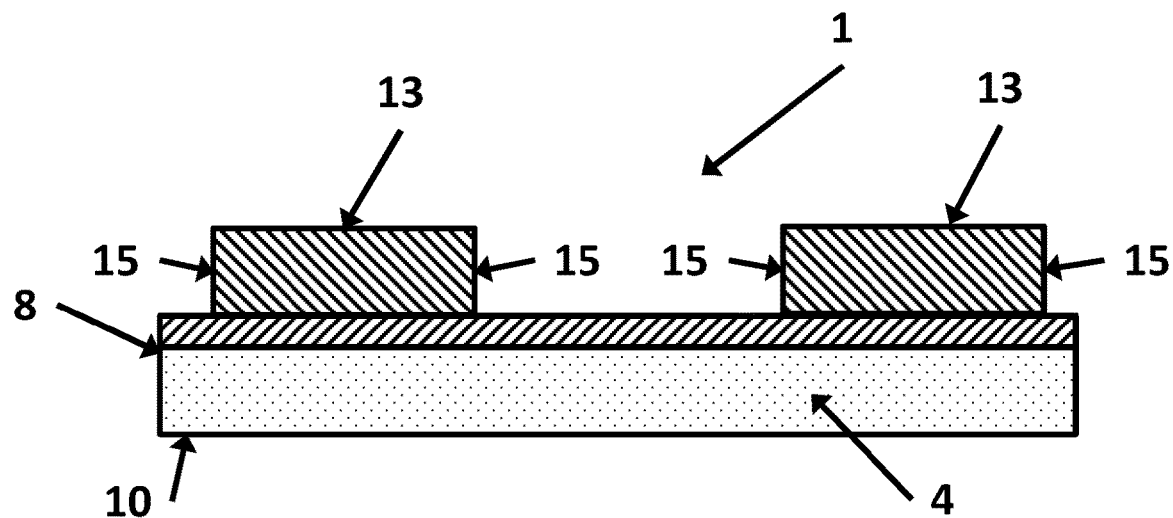
FIG. 1 shows a schematic sectional view of a prior art glazing.
Figure 2:
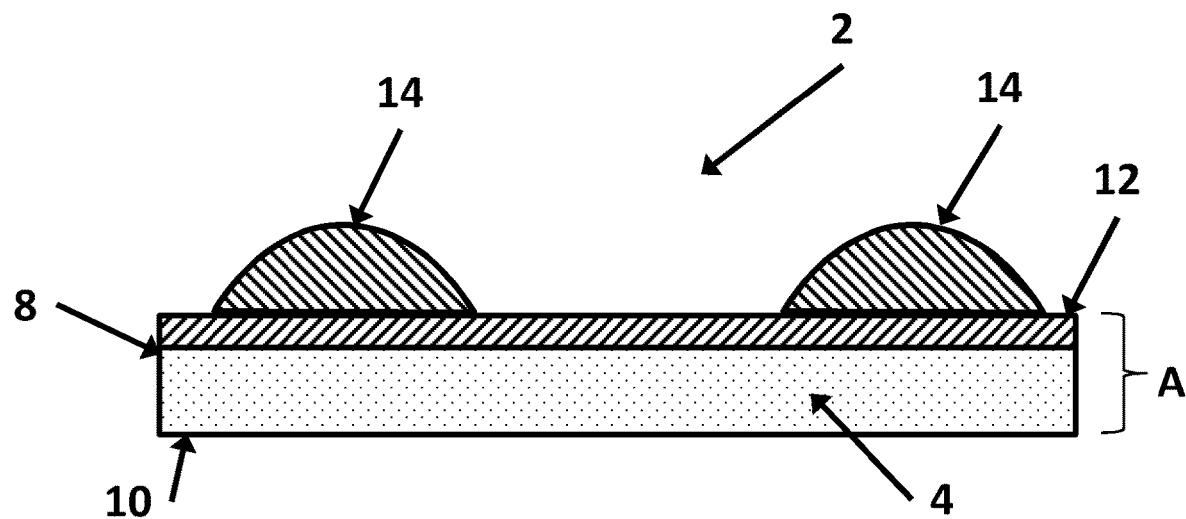
FIG. 2 shows a schematic sectional view of a glazing according to an embodiment of the invention.

FIG. 2 shows a glazing 2 according to an embodiment of the invention. The glazing comprises a substrate 4 having a first surface 8 and a second surface 10. In the illustrated embodiment, the substrate is a 4 mm sheet of float glass. The first surface 8 is that surface of the glazing which faces the exterior of a building when mounted in use, often referred to as "surface #1" of the glazing. An optional antireflection coating 12 is provided directly on to the first surface 8, forming a product CA', and a UV reflectance coating 14 is provided on top of the antireflection coating 12 in a patterned arrangement comprising a plurality of stripes 14.

In each of the embodiments of the invention, each of the plurality of stripes has a thickness that changes by 10 nm or less over every 1 mm in width, preferably by 6 nm or less over every 1 mm, more preferably by 3 nm or less over every 1 mm, and even more preferably, each of the plurality of stripes has a thickness that changes by 1.5 nm or less over every 1 mm in width.

Figure 3:
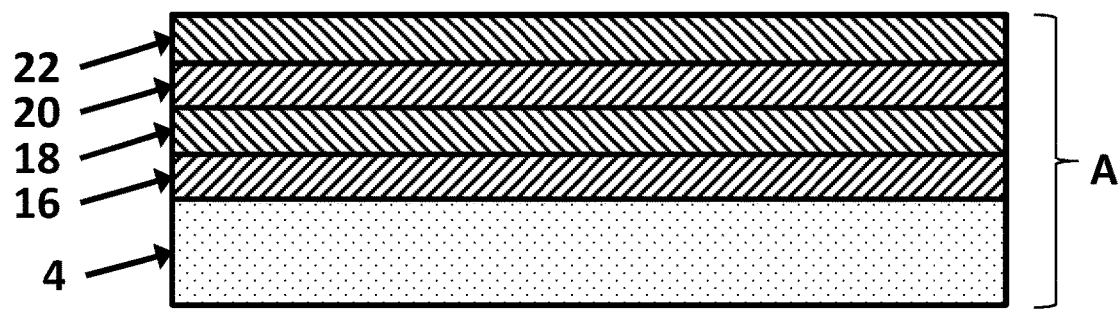
FIG. 3 shows a schematic sectional view of a part of the glazing of FIG. 2.

As a preferred example, the antireflection coating 12 may be deposited on to the substrate 4 using a known chemical vapor deposition process in the float bath region of a float furnace. The coating 12 includes of a plurality of layers as shown in FIG. 3, a specific example comprising: a first layer 16 of $SnO_2$ having a geometric thickness of approximately 12 nm; a second layer 18 of $SiO_2$ having a geometric thickness of approximately 25 nm deposited over the first layer 16; a third layer 20 of $SnO_2$:F having a geometric thickness of approximately 110 nm deposited over the second layer 18; and a fourth layer 22 of $SiO_2$ having a geometric thickness of approximately 90 nm deposited over the third layer 20. Such a coating is hereinafter also referred to as an Optiview coating.

Figure 4:
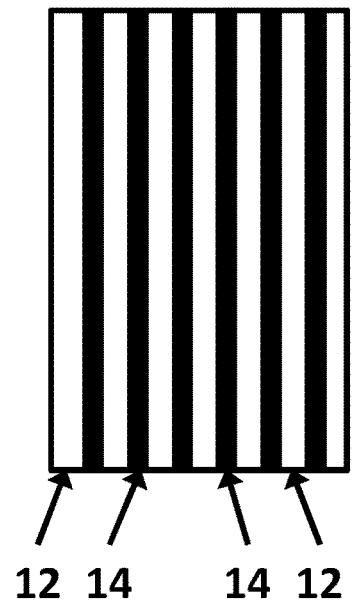
FIG. 4 shows a plan view of a glazing according to the present invention.

Further, in the specific example, the UV reflectance coating 14 comprises titanium oxide having a geometric thickness of approximately 31 nm. As shown in FIG. 4, the coating 14 was deposited in a striped pattern directly on top of the antireflection coating 12. Deposition was by reactive magnetron sputter coating as will be described in further detail below.

Figure 5:
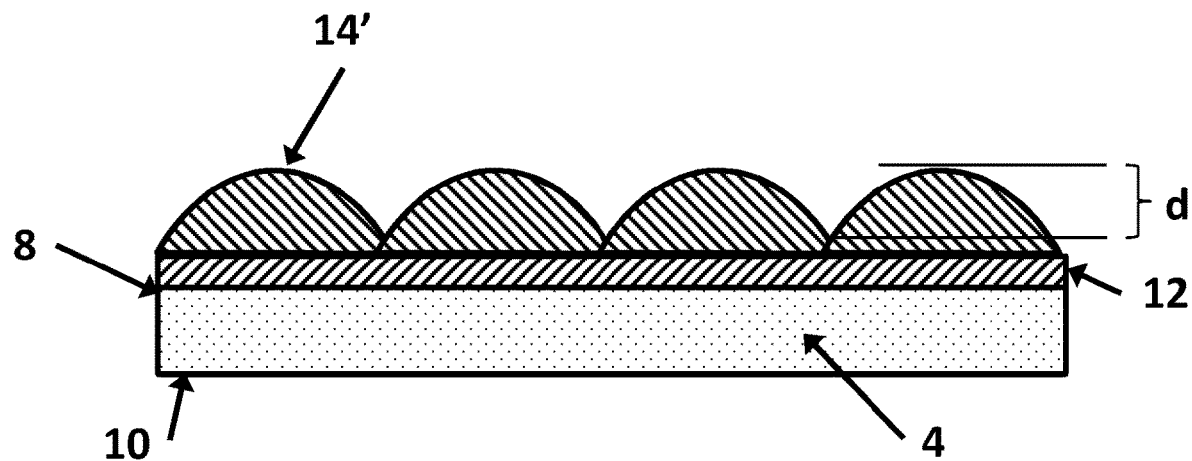
FIG. 5 shows a schematic sectional view of a glazing according to an alternate embodiment of the invention.

FIG. 5 shows an alternate embodiment where the mask was spaced from the substrate and positioned relative to the source of the coating material such that the thickness of the UV reflectance coating 14' did not drop to zero between the stripes; i.e. the stripes are interconnected. With the difference "d" between the maximum coating thickness at each stripe and the minimum coating thickness between the stripes being at least 10 nm, the patterned arrangement of this embodiment also provides a glazing for minimizing or preventing bird collisions with windows, while reducing the impact on human visual perception of a pattern on the glazing.

Figure 6:
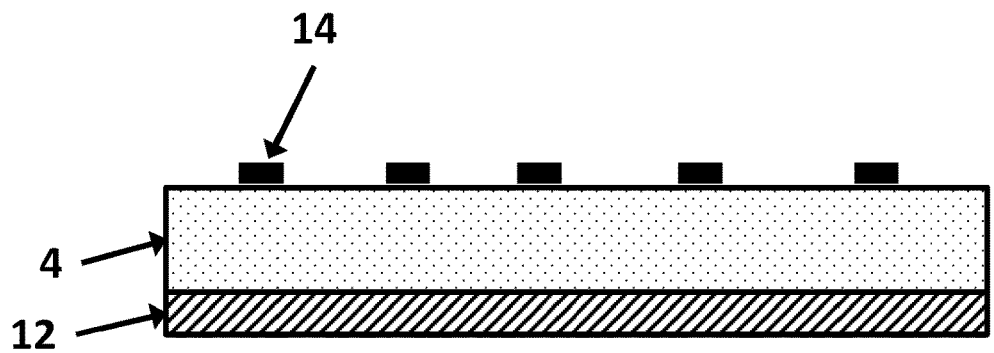
FIG. 6 shows a schematic sectional view of an embodiment of a glazing according to the invention.

FIG. 6 shows an embodiment of the invention having a single glazed construction in which the UV reflectance coating 14 is deposited directly on to surface #1 of the glass substrate 4 and the antireflection coating 12 is deposited on to surface #2 of the substrate.

Figure 7:
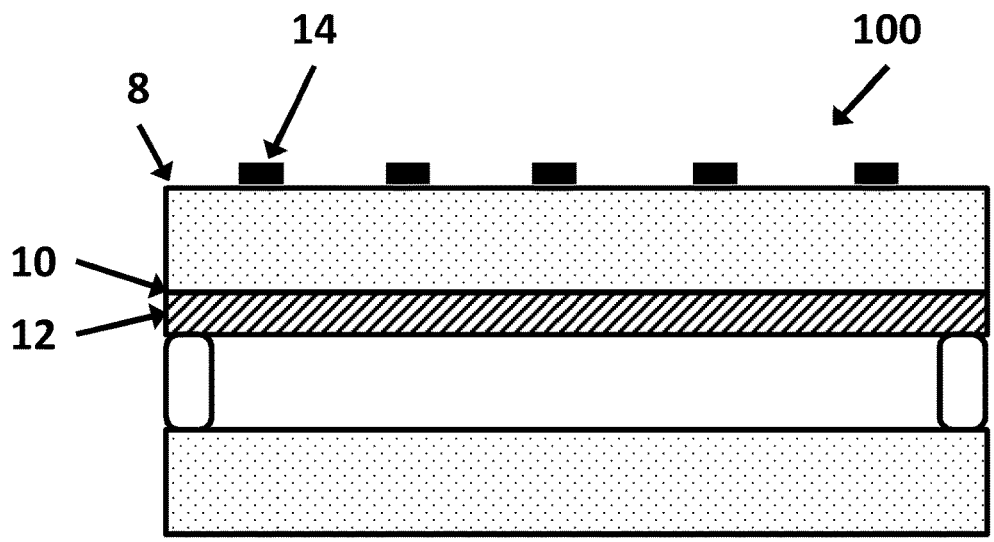
FIG. 7 shows a schematic sectional view of an embodiment of an insulated glazing unit according to the invention.

FIG. 7 shows an embodiment of the invention having a double glazed construction 100 with $TiO_2$ coating on an external surface (surface #1). An antireflection coating 12 is deposited on the surface 10 (surface #2).

Figure 8:
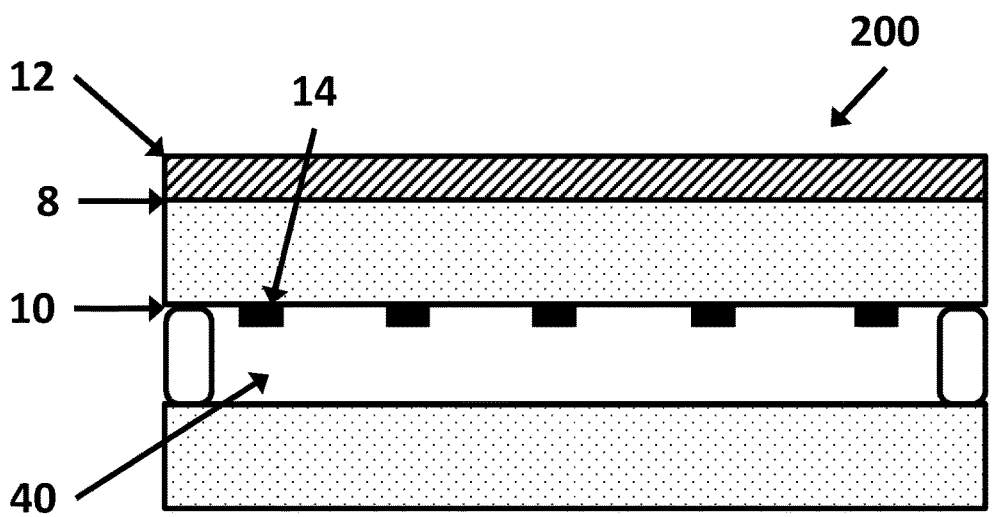
FIG. 8 shows a schematic sectional view of an embodiment of an insulated glazing unit according to the invention.

FIG. 8 shows an alternative embodiment of the invention wherein a double glazed unit 200 has the antireflection coating 12 on surface #1 of the glazing and a UV reflective coating 14 on a surface 10 facing a space 40 (surface #2) of the unit. It has been found that it may be better to have the clear glass pane as the outside ply than to have the antireflection coating on surface #1. This may an advantageous arrangement for this double glazing option as the sputtered coating is kept inside the unit and is therefore less prone to damage.

Figure 9:
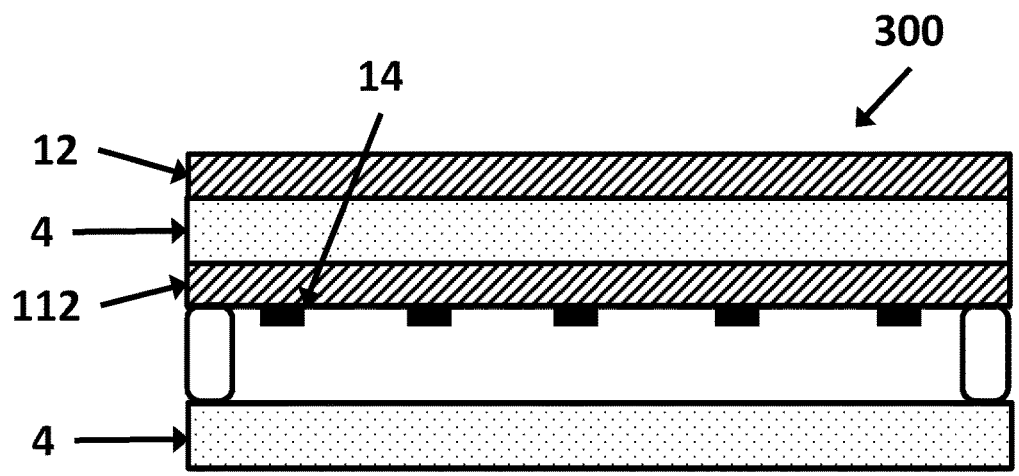
FIG. 9 shows a schematic sectional view of an embodiment of an insulated glazing unit according to the invention.

FIG. 9 shows a further alternative embodiment of the invention having a double glazed unit 300 with antireflection coating 12 on surface #1 and a second antireflection coating 112 on surface #2 of the first ply. A UV reflective coating 14 is deposited over the coating 112 on surface #2 in a striped arrangement.

Figure 10:
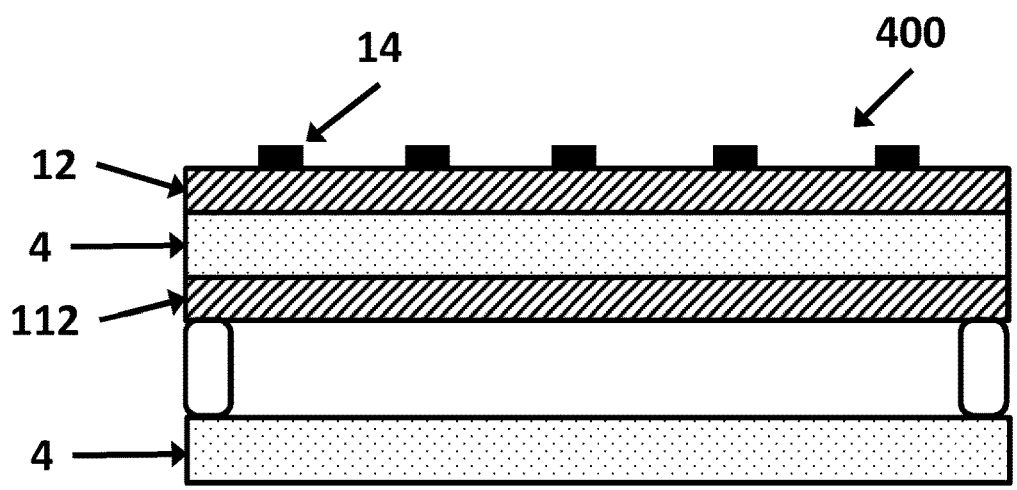
FIG. 10 shows a schematic sectional view of an embodiment of an insulated glazing unit according to the invention.

FIG. 10 shows a further embodiment of the invention having a double glazed unit 400 having antireflection coating 12 on surface #1, a second antireflection coating 112 on surface #2, and a UV reflective coating 14 deposited on top of the coating 12 on surface #1.

Figure 11:
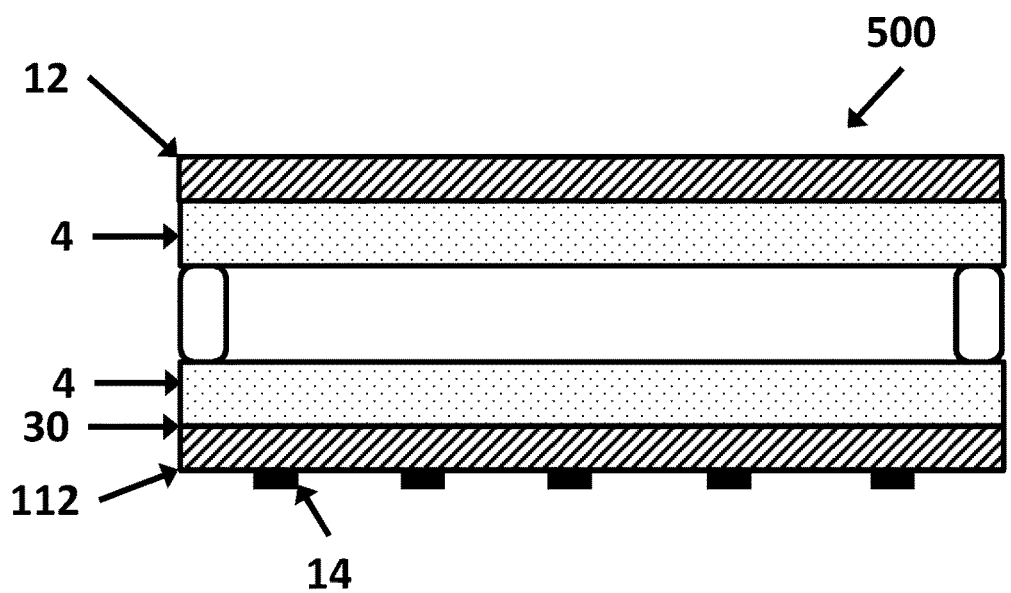
FIG. 11 shows a schematic sectional view of an embodiment of an insulated glazing unit according to the invention.

FIG. 11 shows a further embodiment of the invention having a double glazed unit 500 having antireflection coating 12 on surface #1 and a second antireflection coating 112 on surface #4 (30) of the unit. A UV reflective coating 14 is deposited on top of coating 112 on surface #4. This may be a simpler configuration for glazings with two antireflection coatings, rather than adding a reverse coating to a coated pane. Further, coating the antireflection coating directly ensures for minimal issues with back surface damage and the antireflection effect is destroyed locally.

Figure 12:
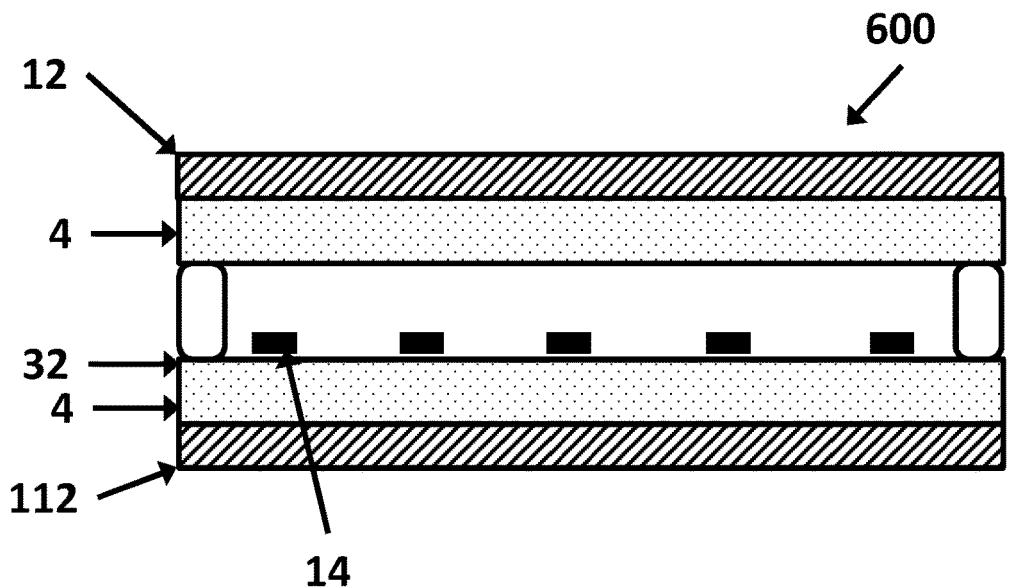
FIG. 12 shows a schematic sectional view of an embodiment of an insulated glazing unit according to the invention.

FIG. 12 shows a further alternative embodiment of the invention wherein a double glazed unit 600 has an antireflective coating 12 on surface #1 and a second antireflection coating 112 on surface #4. A UV reflection coating 14 is deposited on an inner surface 32 of the second ply known as surface #3.

Figure 13:
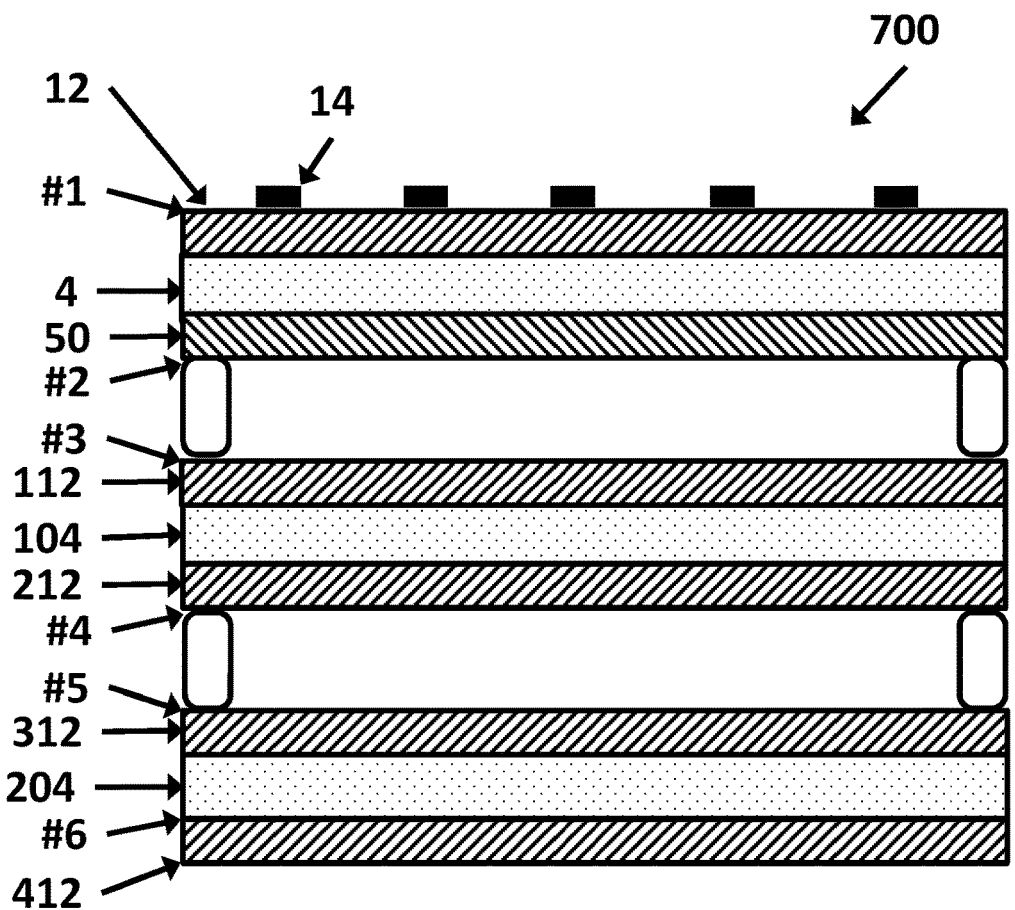
FIG. 13 shows a schematic sectional view of a triple glazed unit in accordance with an embodiment of the invention.

FIG. 13 shows an embodiment of a triple glazed unit 700. The unit 700 comprises a first sheet of glazing material 4, a second sheet of glazing material 104, and a third sheet of glazing material 204. Antireflection coatings 12, 112, 212, 312 and 412 are provided on surfaces #1, #3, #4, #5 and #6 of the sheets as shown in the figure. A UV reflection coating 14 is provided on top of the antireflection coating 12, in a striped arrangement. A solar control coating 50 is provided on surface #2. A low-E coating may in addition be deposited on surface #2, and/or surface #5, and/or surface #6.

Figure 14:
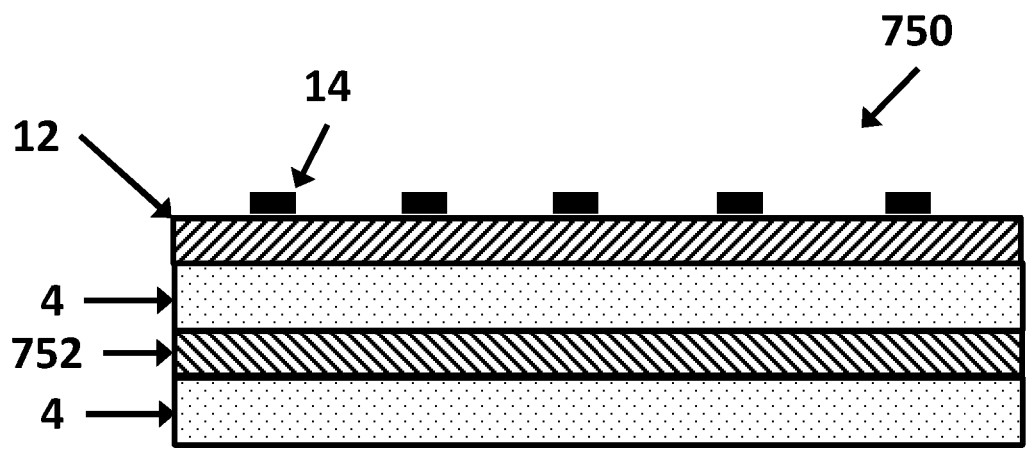
FIG. 14 shows a schematic sectional view of a laminated glazing in accordance with an embodiment of the invention.

FIG. 14 shows an embodiment of a laminated glazing 750 in accordance with the invention. The two substrates 4 (or sheets of transparent glazing material) are bonded together in conventional fashion by a ply of plastics interlayer 752, normally polyvinyl butyral or pvb. An antireflection coating 12 is provided on surface #1 and a UV reflective coating 14 is deposited on top of the coating 12 on surface #1. The antireflection coating and the UV reflective coating may be provided on other surfaces of the laminated glazing. Other coatings, such as a solar control coating or low E coating, may be provided on other surfaces of the laminated glazing. In addition, the laminated glazing could be incorporated into any of the insulated glazing units described above. A laminated glazing in accordance with the invention may be advantageous in that the plastics interlayer will absorb UV reflections from surface #3, thereby increasing the contrast ratio.

EXAMPLES

The following examples, which constitute the best mode presently contemplated by the inventors for practicing the present invention, are presented solely for the purpose of further illustrating and disclosing the present invention, and are not to be construed as a limitation on the invention.

1. Magnetron Sputtering

In all but one of these examples, bird-safe striped $TiO_2$ coatings were produced on Pilkington OptiView™ substrates by masking the $TiO_2$ deposition. The substrates were thus 4 mm clear glass having a coating stack of, nominally, 12 nm SnOx/25 nm $SiO_2$/110 nm SnOx/90 nm SiO2, each layer deposited by CVD. In the remaining example, the substrate was uncoated, 4 mm clear glass.

Modelling work showed that the optimum bird-visible-UV response is obtained by depositing 35 nm of $TiO_2$ on top of an Optiview™ coating. The reflective $TiO_2$ not only provides enhanced UV reflectance, but also eliminates the anti-reflective effect of the Pilkington OptiView™ at the stripe location. This gives a dual enhancement of the UV pattern.

It is noted that UV intensity (or "BUVAM1") is a measure of Bird-visible UV energy calculated by convoluting a Gaussian curve, representing Bird UV-cone vision, with the air-mass 1 (AM1) solar energy curve. The Gaussian curve is centred on 370 nm with approx. ±25 nm width at FWHM. The BUVAM1 curve is integrated against the measured/predicted spectrum for the coating to give an integrated BUVAM1 curve. The BUVAM1 curve can be used as the data source for integration against the model spectral curves within the CODE optical modelling software. It can be used to generate integrated Bird UV figures for different construction embodiments, and to optimise those constructions for performance and colour. As used herein, contrast ratio= (UV intensity at the thickest point/UV intensity at the thinnest point).

Figure 15:
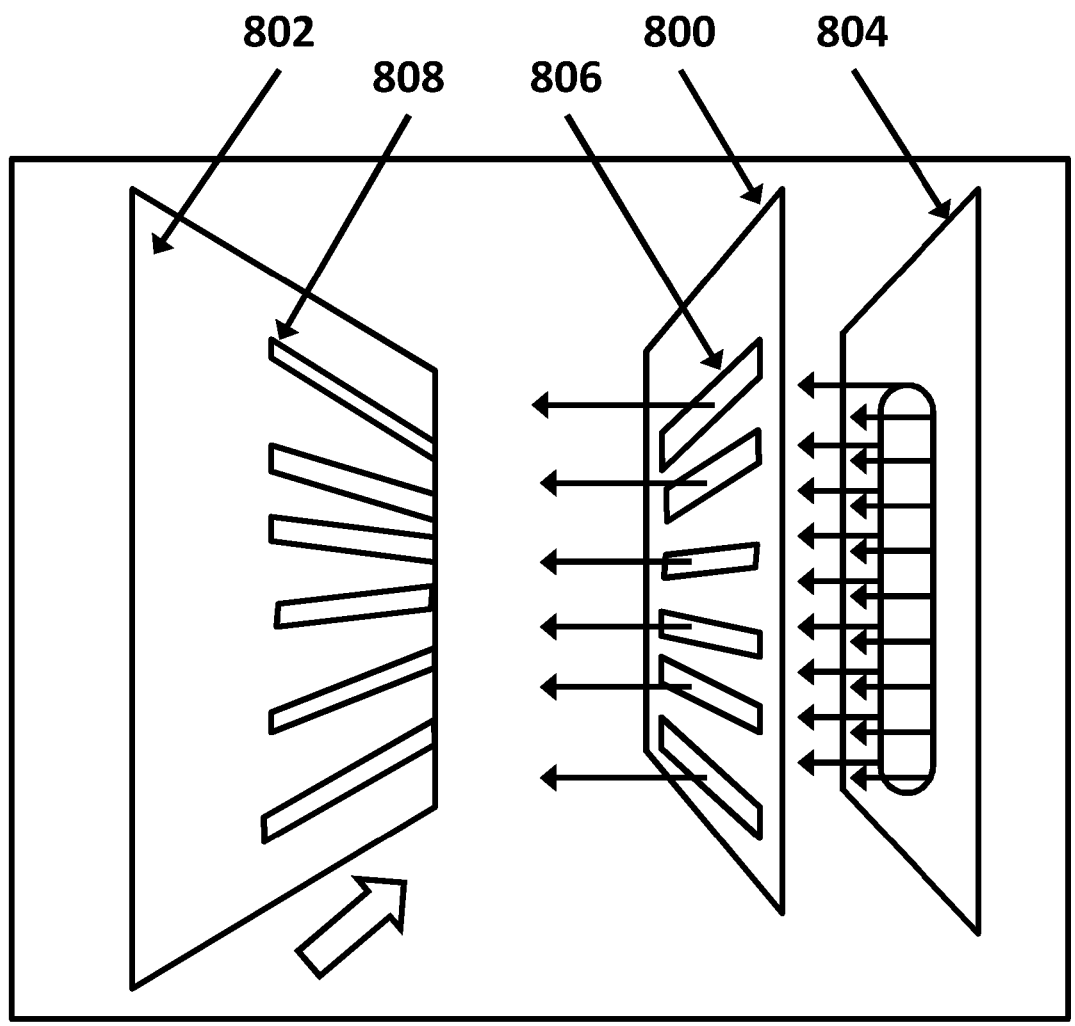
FIG. 15 shows a schematic view of an apparatus for use in an embodiment of the method of the invention.

A UV reflectance coating of $TiO_2$ was deposited by reactive magnetron sputtering through a mask 800 that was positioned between the substrate 802 and sputtering target 804, as illustrated schematically in FIG. 15. Due to the sputtering process having a line-of-sight nature with a cosine distribution of material flux from the source, this results in a gradual tailing off of thickness under the mask. As used herein, the term cosine distribution means a distribution similar in shape to a vertically shifted cosine curve, wherein each maximum corresponds to a coating thickness on a centreline of an elongate slot in a mask, and each minimum corresponds to a coating thickness at a midpoint between adjacent elongate slots. The distribution may deviate from cosine in that width of the maximum and minimum may differ. Moving the mask closer or further from the substrate makes the edge sharper or more gradual, respectively. For all of the examples, the mask 800 was spaced from the surface of the substrate 802 by 20 mm, and the mask 800 was spaced from the sputtering target by 170 mm.

The mask 800 was provided with a plurality of elongate slots 806 spaced uniformly with respect to one another. For certain examples, the slots 806 each had a width of 25 mm space, with 75 mm between each slot 806, while in others the slots 806 each had a width of 10 mm space, with 90 mm between each slot 806. The former may be referred to herein as "wide stripes" while the latter may be referred to as "narrow stripes".

The mask 800 had a width greater than the size of the sputtering target 804 in order to provide effective masking. The mask was bolted to the coating plant body using threaded studding that allowed the mask separation from the substrate and target to be adjusted. As the glass substrate 802 was transported beneath the mask 802 in the direction of the lengths of the slots 806, a sputtered coating 808 in a patterned arrangement of stripes was deposited.

The titanium oxide coatings produced could have been made under many conditions of pressure, and $Ar:O_2$ ratios, and could be made from metal Ti targets sputtered reactively in $Ar/O_2$ or conductive oxide targets sputtered in pure Ar or $Ar/O_2$ mixes. For this example, the titanium oxide coating was deposited from a pure Ti metal target sputtered in an $Ar/O_2$ atmosphere under plasma-emission monitor control. The coating was deposited using a Von Ardenne GC120 sputter coating plant equipped with dual planar magnetron cathode. The process conditions were as follows: 25 kW 100 kHz MF, Speed 441 mm/min (4 passes), Ar 250 sccm, 30% PEM setpoint for Ti emission, controlling O2 flow (giving approx. 60 sccm).

a) Example 1

Although the target thickness of the coated stripes was 35 nm, the actual deposited thickness for example 1 was calculated by optical modelling of a single layer on a clear float glass substrate coated at the same time as the Optiview™ coating to be 40 nm thick at the thickness point. The coating thickness was variable with position due to the "soft-edge" nature of the masking and deposition process.

Figure 16A:
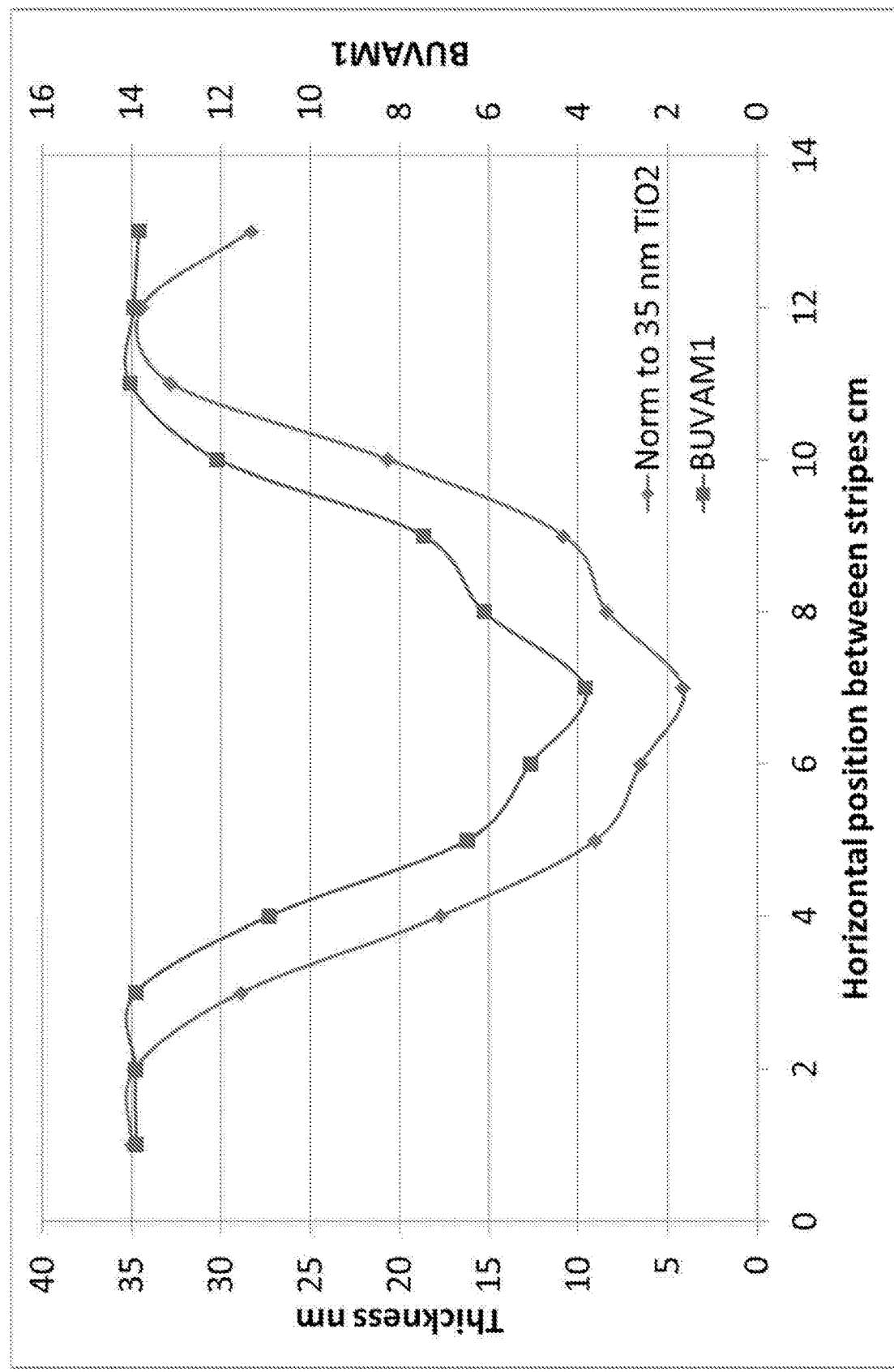
FIGS. 16a and 16b are graphs showing normalised thickness and BUVAM1 for a) 35 nm & b) 40 nm $TiO_2$, respectively, between thickness maxima, for the wide stripe pattern of Example 1.
Figure 16B:
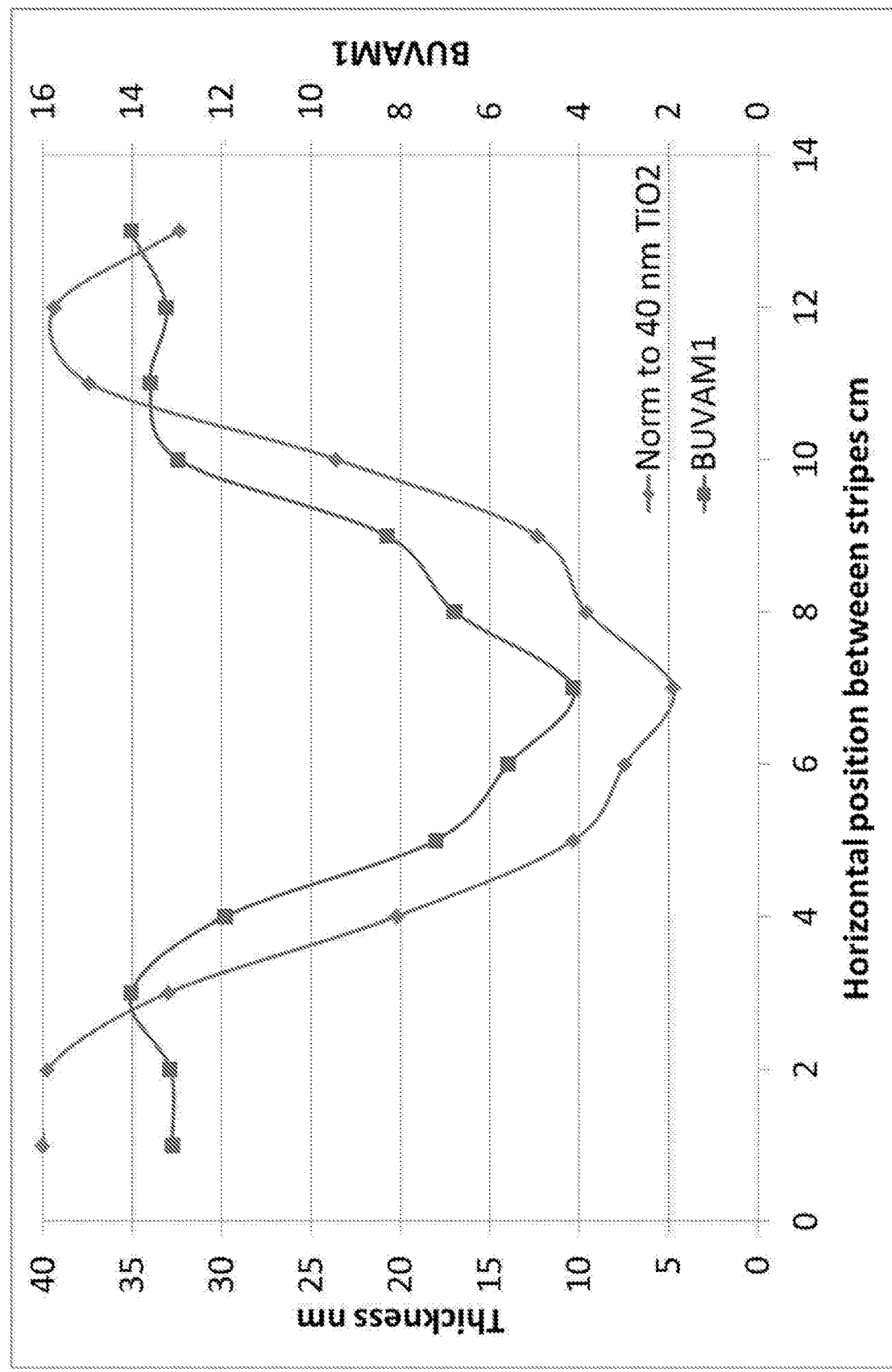

To determine the nature of this thickness variation, another coating run was carried out during setup so that a trench was left across the coating to allow physical measurement of thickness. The trench was made by applying a fine ink line to the glass before coating. After coating, the ink was removed with solvents taking the coating with it. This allowed the thickness of the coating to be measured at regular intervals using a Dektak XT stylus profilometer. The coating thickness was normalised to 35 nm to show the expected coating thickness variation at design thickness and the resulting BUVAM1 intensity (See FIG. 16a). The coating variation at 40 nm maximum is shown in FIG. 16b.

Tables 1 and 2 below illustrate the changes in thickness and correspond to the graphs in FIGS. 16a and 16b, respectively.

TABLE 1

| Horizontal position (mm) | Thickness (nm) | Thickness change per mm width (nm) |
|---|---|---|
| 10 | 35.0 | — |
| 20 | 34.8 | 0.02 |
| 30 | 28.9 | 0.59 |
| 40 | 17.7 | 1.12 |
| 50 | 9.0 | 0.87 |
| 60 | 6.5 | 0.25 |
| 70 | 4.1 | 0.24 |
| 80 | 8.3 | 0.42 |
| 90 | 10.8 | 0.25 |
| 100 | 20.7 | 0.99 |
| 110 | 32.8 | 1.21 |
| 120 | 34.4 | 0.16 |
| 130 | 28.3 | 0.61 |

TABLE 2

| Horizontal position (mm) | Thickness (nm) | Thickness change per mm width (nm) |
|---|---|---|
| 10 | 40.0 | — |
| 20 | 39.8 | 0.02 |
| 30 | 33.0 | 0.68 |
| 40 | 20.2 | 1.28 |
| 50 | 10.3 | 0.99 |
| 60 | 7.4 | 0.29 |
| 70 | 4.7 | 0.27 |
| 80 | 9.6 | 0.49 |
| 90 | 12.3 | 0.27 |
| 100 | 23.6 | 1.13 |
| 110 | 37.4 | 1.38 |
| 120 | 39.4 | 0.20 |
| 130 | 32.3 | 0.71 |

From Table 1, it can be seen that for the stripes with thickness at 35 nm, the maximum change in thickness was 1.21 nm per 1 mm change in horizontal position or width, while from Table 2 it can be seen that for the stripes with thickness at 40 nm, the maximum change in thickness was 1.38 nm per 1 mm change in horizontal position or width. When this example was viewed from a distance, the patterned arrangement of stripes was still visible to humans, but close up the diffuse edges were far less apparent (and thus more aesthetically pleasing) when compared with a similar arrangement of stripes having hard edges. This was particularly the case in transmittance from "inside" the building.

It was seen that, for this mask-substrate separation, the coating maintains continuity between stripe maxima, but that the thickness was very clearly modulated. It was also observed that this causes an associated modulation in BUVAM1, and that being 5 nm off design thickness causes very little variation. The fact that the film stayed continuous means that the optimum contrast ratio was not reached, as the minimum BUVAM1 values are 3.8 and 4.1 for 35 and 40 nm, respectively. However, the BUVAM1 for the Pilkington OptiView™ coating with no $TiO_2$ on top (ideal situation) is 2.2. This means that the BUVAM1 contrast ratio was reduced from the optimum 6.3 to 3.7 (for 35 nm) or 3.2 (for 40 nm). This was still a very significant contrast ratio, and it is expected this can be improved upon by moving the mask closer to the substrate or narrowing the mask slots, thereby reducing the minimum thickness of the $TiO_2$ deposited The effect of continuous coating and being 5 nm from the target on UV Intensity (BUVAM1) and contrast ratio is shown in Table 3 below.

TABLE 3

| | Sharp-edge pattern 0 nm min $TiO_2$ | | Soft-edge pattern 4.1/4.7 nm min $TiO_2$ (for 35/40 nm max) | |
|---|---|---|---|---|
| $TiO_2$ max nm | UV Intensity (BUVAM1) | Contrast Ratio | UV Intensity (BUVAM1) | Contrast Ratio |
| 0 | 2.2 | 1 | N/A | N/A |
| 35 | 13.9 | 6.3 | 3.8 | 3.7 |
| 40 | 13.1 | 6.0 | 4.1 | 3.2 |

The tunnel testing was conducted in accordance with a test method that is a modification of the method of ONR 19140:2010 Austrian Standards Institute publication "Bird-safe glass: testing of efficiency" [2010], the modified test being described in the publication "Vogelanprall an Glasflachen, PrUfbericht Ornilux Mikado" dated February 2012, in section 2.3.3 "Fenster Versuch" on page 11. This publication was downloaded from http://www.vogelglas.info/public/vogelanprall-ornilux-mikado_2012.pdf. The modification takes account of reflections, by mounting the test sample and the reference sample each at 35 degrees to the flight axis, and providing a sealed chamber behind the samples such that indirect reflected light intensity is less than 25 W/m2. In accordance with this test, a reference glazing of clear, uncoated glass resulted in bird strikes at a rate of 27.7%. The bird safe glazings in accordance with the invention provide a reduction in the rate of bird strikes to less than 27%, preferably less than 20%, and most preferably less than 10%.

The tunnel testing showed that the coated substrates of this example, oriented such that the stripes extend vertically, were an effective bird deterrent, resulting in bird strikes at only 6.0%.

Thus, it was shown that by this example that using a shadow mask placed between the coating source and substrate that is positioned in such a way as to be separated from the substrate enough to allow the deposed coating to extend beneath the edges of the mask in a graduated way, the edges of the stripes are soft or diffuse rather than sharply defined. When viewed from a distance, the patterned arrangement of stripes is still visible to humans, but close up the diffuse edges mean that the pattern is far less apparent. This is particularly the case in transmittance from "inside" a building. At the same time, the patterned arrangement of stripes provided an effective deterrent to bird strikes.

b) Examples 2-6 and C7

These examples were prepared by the same method described above in respect of example 1, with the following exceptions. Examples 2-4 were all provided with vertically oriented, narrow stripes. That is, the slots 806 in the mask each had a width of 10 mm space, with 90 mm between each slot 806. Example 5 was provided with horizontally oriented, narrow stripes. Example 6 was provided vertically oriented, narrow stripes on an uncoated, clear glass substrate. Comparative example C7 was provided with vertically oriented, narrow stripes and a smaller contrast ratio.

Figure 16C:
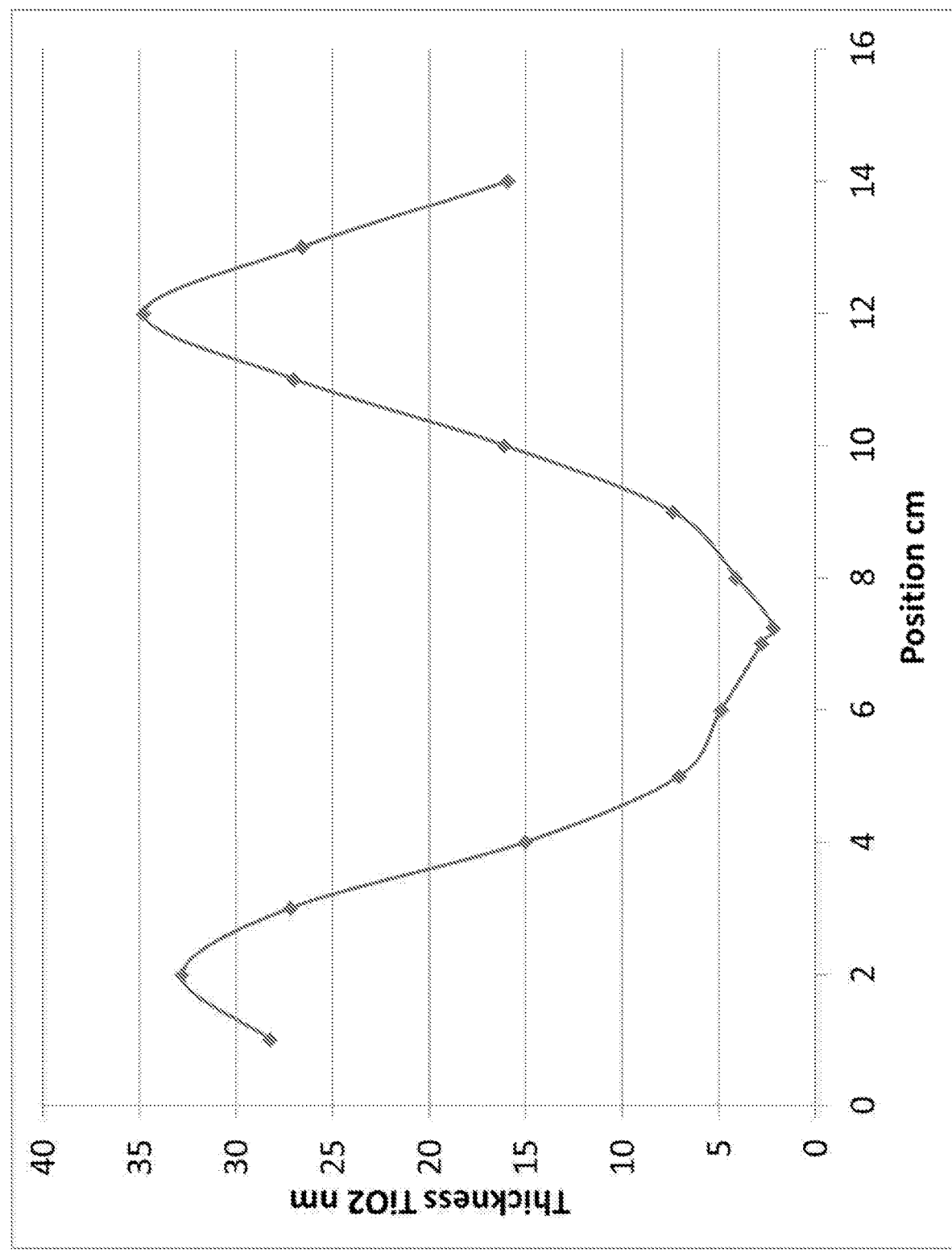
FIG. 16c is a graph showing normalised thickness for 35 nm $TiO_2$ between thickness maxima, for a narrow stripe pattern.

Narrow stripe examples having nominal titania thickness maximum 35 nm and minimum 0 nm have a similar thickness profile to that shown in FIG. 16c. Thickness profiles for other narrow stripe examples may be estimated by any known technique of curve fitting using ratios of nominal thicknesses.

For each of these examples, the soft edges were far less visually apparent (and thus more aesthetically pleasing) to humans when compared with a similar arrangement of stripes having hard edges.

The properties and tunnel test results for examples 2-6 and C7 are shown in Table 4 below.

TABLE 4

| Example | UV Intensity (BUVAM1) - Thickest point | UV Intensity (BUVAM1) - Thinnest point | Contrast ratio | Tunnel Test Result (%) |
|---|---|---|---|---|
| 2 | 14.8 | 2.4 | 6.2 | 6.6 |
| 3 | 14.7 | 2.7 | 5.4 | 5.7 |
| 4 | 13.2 | 5.2 | 2.5 | 17.9 |
| 5 | 14.4 | 2.7 | 5.4 | 13.0 |
| 6 | 12.2 | 2.7 | 4.5 | 8.0 |
| C7 | 14.9 | 11.6 | 1.3 | 33.0 |

While example 5 was effective at deterring bird strikes, from a comparison with example 3 it can be seen that horizontally oriented stripes are not as effective as vertically oriented stripes of the same width and contrast ratio. Example 4 illustrates the decrease in effectiveness with a lower contrast ratio relative to otherwise similar patterns, while comparative example C7 illustrates that, for a given pattern, a contrast ratio that is sufficiently low will result in no effect on the rate of bird strikes.

2. Chemical Vapor Deposition

In this example, the substrate was glass having a thickness of 3.2 mm and provided with a silica layer having a thickness of 25 nm. Ethyl acetate (EtOAc) and $TiCl_4$ were used as the precursor materials, the reaction of which resulted in the $TiO_2$ coating on the substrate.

Figure 17:
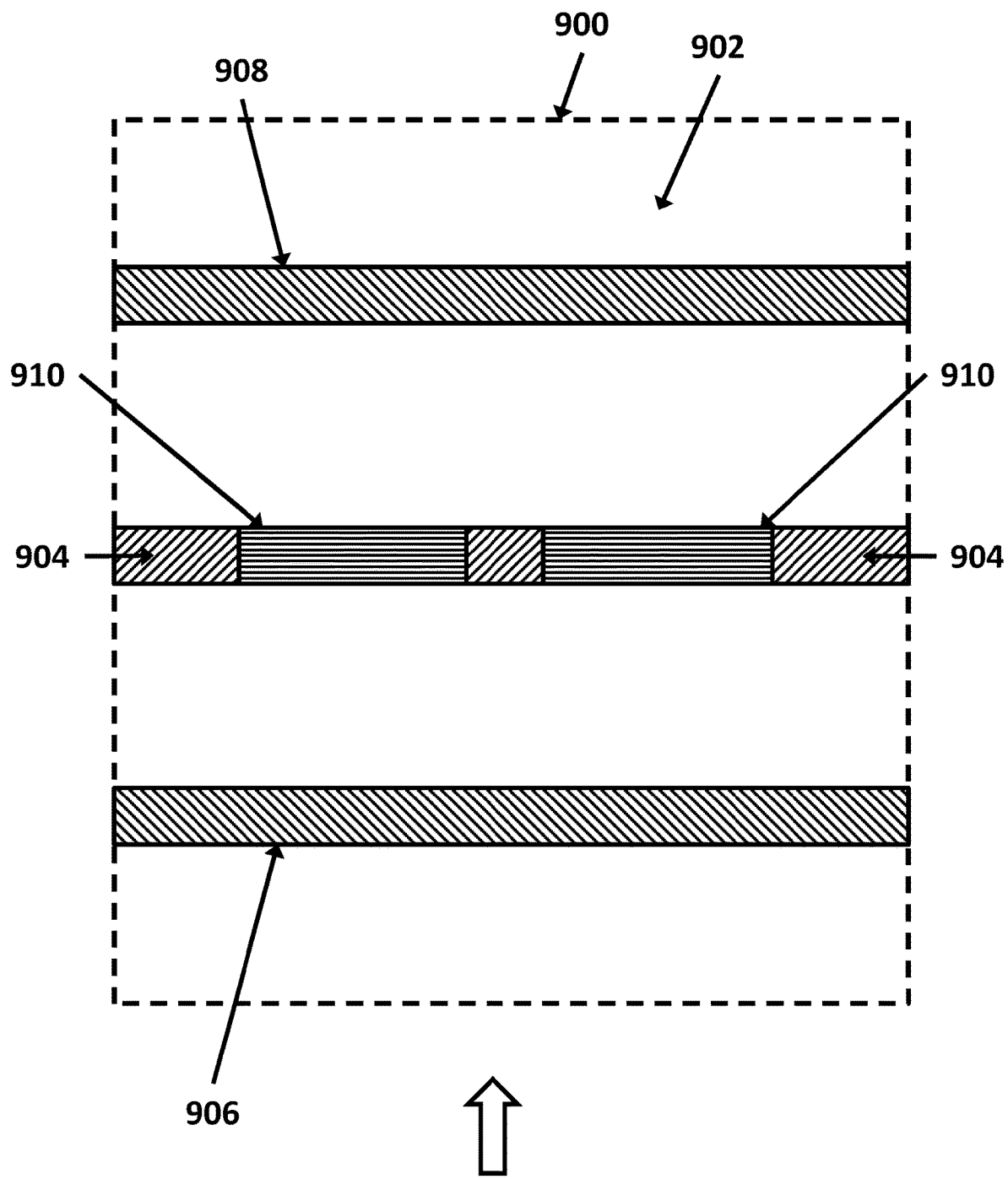
FIG. 17 shows a schematic, bottom view of a chemical vapor deposition coater for use in an embodiment of the method of the invention.

A schematic, bottom view of the atmospheric chemical vapor deposition coater 900 employed to deposit the $TiO_2$ coating is illustrated in FIG. 17. The bottom face 902 of the coater 900 includes a central precursor nozzle 904 in the form of a slot from which the gaseous precursor materials exit the coater 900 and impinge upon the surface of the glass substrate, reacting thereon to deposit the coating. An upstream exhaust nozzle 906 and a downstream exhaust nozzle 908 are provided to carry away unreacted precursor materials, the direction of travel of the glass substrate being shown by the arrow.

The precursor nozzle 904 of the coater 900 was 10" wide and was blocked at two fixed locations by a pair of 3" blocks 910, each positioned 1.5" from the nearest edge of the precursor nozzle 904. Thus, three precursor slots were defined in the precursor nozzle 904: a 1" wide slot between the two blocks 910 and a 1.5" wide slot at each end of the precursor nozzle 904. To avoid the diffusion of precursor materials near the bottom of the blocks 910, a waffle pack having a honeycomb configuration was positioned in each of the 3 slots defined in the coater nozzle 904. The bottom face 902 of the coater 900 was positioned 6 mm above the top surface of the glass substrate.

To obtain the desired thickness (15 nm to 50 nm) as well as the desired uniformity, the total flow of chemicals, as well as the ratio of EtOAc to $TiCl_4$, was varied. Table 5 summarizes the deposition conditions:

TABLE 5

| Sample | Total Flow of Chemicals (SLM) | $TiCl_4$ % | $EtOAC/TiCl_4$ | Thickness (nm) at thickest point | UV Intensity (BUVAM1) at thickest point |
|---|---|---|---|---|---|
| 1 | 16 | 1 | 2.5 | 19 | 13.9 |
| 2 | 24 | 1 | 2.5 | 27 | 15.3 |
| 3 | 32 | 1.25 | 2.5 | 50 | 12.9 |

These examples illustrated that a $TiO_2$ coating having the desired patterned arrangement of stripes could be formed on a glass substrate by a chemical vapor deposition process. A visual inspection of these examples revealed that the resulting stripes all included soft edges as described herein, i.e. thickness that changes by 10 nm or less over every 1 mm in width, providing stripes that were far less apparent (and thus more aesthetically pleasing) when compared with a similar arrangement of stripes formed with hard edges.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed:

1. A glazing for minimizing or preventing bird collisions with windows or other glazings, the glazing comprising at least one substrate with a UV reflectance coating comprised of titanium dioxide deposited over the substrate in a patterned arrangement comprised of a plurality of stripes, wherein the difference between the maximum coating thickness at each stripe and the minimum coating thickness between adjacent stripes is at least 10 nm, wherein each of the plurality of stripes has a thickness that changes by 6 nm or less over every 1 mm in width of the substrate in a direction transverse to the stripes.

2. The glazing as defined in claim 1, wherein the stripes are equidistantly spaced apart from one another.

3. The glazing as defined in claim 1, further comprising an antireflection coating between the UV reflectance coating and the substrate.

4. The glazing as defined in claim 3, wherein a plurality of substantially 2.5 cm wide UV reflecting stripes of said reflectance coating are provided, each said stripe being separated by a substantially 7.5 cm antireflection coating stripe.

5. The glazing as defined in claim 3, wherein the antireflection coating is provided adjacent the substrate.

6. The glazing as defined in claim 1, wherein the UV reflectance coating is deposited on an exterior facing surface of the substrate.

7. The glazing as defined in claim 3, wherein the UV reflectance coating is deposited directly on the antireflection coating.

8. A glazing as defined in claim 1, wherein the UV reflectance coating comprises titanium dioxide having a geometric thickness of between substantially 10-50 nm thick.

9. A glazing as defined in claim 3, wherein the antireflection coating comprises $SnO_x$ and/or $SiO_2$.

10. A glazing as defined in claim 3, wherein the antireflection coating comprises a plurality of layers, said layers comprising: a first layer comprising tin oxide, a second layer comprising silicon oxide, a third layer comprising fluorine doped tin oxide, and a fourth layer comprising a silicon oxide.

11. A glazing as defined in claim 1, wherein each of the plurality of stripes has a thickness that changes by 3 nm or less over every 1 mm in width.

12. A glazing as defined in claim 1, wherein each of the plurality of stripes has a thickness that changes by 1.5 nm or less over every 1 mm in width.

13. A glazing as defined in claim 1, wherein the UV intensity, as measured by the BUVAM1 method, of the UV reflectance coating at a thickest part of each stripe is in the range of 1 to 15.

14. A glazing as defined in claim 1, wherein the contrast ratio for each stripe is greater than 2, preferably between 2 and 7, and more preferably between 4 and 7.

15. A glazing as defined in claim 1, wherein the UV reflectance coating also reflects and absorbs visible radiation.

16. A laminated glazing comprising a glazing as defined in claim 1 bonded to a sheet of transparent glazing material by a ply of plastics interlayer, preferably wherein the UV reflectance coating is disposed on surface #1 of the laminated glazing.

17. An insulated glazing unit for minimizing or preventing bird collisions with windows or other glazings, comprising a first sheet of glazing material, a second sheet of glazing material held in a spaced apart relationship to the first sheet of glazing material, an antireflection coating, and at least one UV reflectance coating, wherein the UV reflectance coating is comprised of titanium dioxide and is provided in a patterned arrangement comprising a plurality of stripes, wherein the difference between the maximum coating thickness at each stripe and the minimum coating thickness between adjacent stripes is at least 10 nm, the plurality of stripes each, having a thickness that changes by 6 nm or less over every 1 mm in width of the substrate in a direction transverse to the stripes, and the antireflection coating is between the UV reflectance coating and either the first and/or second sheet of glazing material.

18. A method of manufacturing a glazing for minimizing or preventing bird collisions with windows or other glazings, the method comprising:
    providing at least one substrate having a surface;
    providing a mask that is spaced apart from the surface of the substrate, the mask comprising a patterned arrangement of apertures, the patterned arrangement comprising a plurality of stripes; and
    directing a coating material through the apertures in the mask to the surface of the substrate to deposit a UV reflectance coating comprised of titanium dioxide in a patterned arrangement on the surface of the substrate, the patterned arrangement comprising a plurality of stripes, wherein the difference between the maximum coating thickness at each stripe and the minimum coating thickness between adjacent stripes is at least 10 nm,
    wherein each of the plurality of stripes is deposited so as to have a thickness that changes by 6 nm or less over every 1 mm in width of the substrate in a direction transverse to the stripes.

19. A glazing as defined in claim 1, wherein the UV reflectance coating has a geometric thickness of between substantially 10 and 100 nm.

20. A glazing as defined in claim 1, wherein each of the plurality of stripes has a width in the range of 1 cm to 10 cm.

* * * * *